(12) United States Patent
Takahoshi et al.

(10) Patent No.: US 8,780,488 B2
(45) Date of Patent: Jul. 15, 2014

(54) SERVO INFORMATION RECORDING METHOD AND MAGNETIC STORAGE APPARATUS

(71) Applicant: Showa Denko K.K., Tokyo (JP)

(72) Inventors: Hideaki Takahoshi, Chiba (JP); Daisuke Amiya, Chiba (JP); Hiroshi Sakai, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 14/071,787

(22) Filed: Nov. 5, 2013

(65) Prior Publication Data
US 2014/0133047 A1    May 15, 2014

(30) Foreign Application Priority Data
Nov. 14, 2012 (JP) .................... 2012-250571

(51) Int. Cl.
*G11B 5/596* (2006.01)

(52) U.S. Cl.
USPC ...................................... 360/77.11

(58) Field of Classification Search
USPC ............. 360/135, 77.05, 77.08, 78.14, 73.03, 360/48, 55, 77.11
See application file for complete search history.

(56) References Cited

U.S. PATENT DOCUMENTS
7,477,485 B2 * 1/2009 Soeno et al. .................. 360/135

FOREIGN PATENT DOCUMENTS
JP       2003-228801       8/2003

* cited by examiner

*Primary Examiner* — Nabil Hindi
(74) *Attorney, Agent, or Firm* — IPUSA, PLLC

(57) ABSTRACT

A servo information recording method continuously records servo information in a radial direction of a magnetic disk on a plurality of concentric tracks or on a single spiral track of a first recording layer that forms a magnetic layer of the magnetic disk together with a second recording layer to which data are recorded and from which data are reproduced, wherein the first recording layer has a coercivity higher than that of the second recording layer, and partially overlaps two mutually adjacent tracks when continuously recording the servo information on an entire surface of the first recording layer.

11 Claims, 5 Drawing Sheets

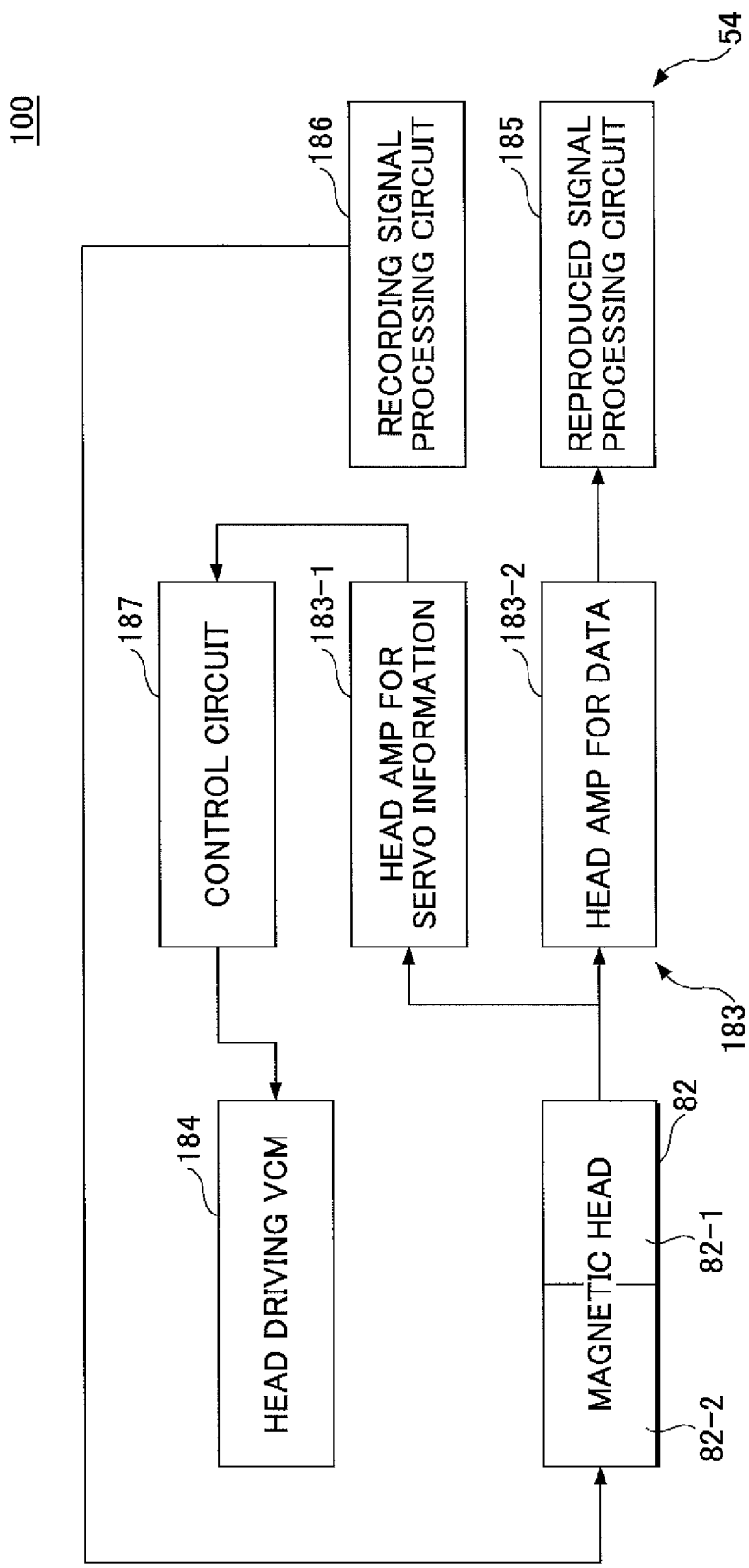

SERVO INFORMATION RECORDING METHOD AND MAGNETIC STORAGE APPARATUS

CROSS-REFERENCE TO RELATED APPLICATIONS

This application is based upon and claims the benefit of priority of the prior Japanese Patent Application No. 2012-250571 filed on Nov. 14, 2012, the entire contents of which are incorporated herein by reference.

BACKGROUND OF THE INVENTION

1. Field of the Invention

The present invention relates to a servo information recording method and a magnetic storage apparatus.

2. Description of the Related Art

Applications of the magnetic storage apparatus such as an HDD (Hard Disk Drive) are increasing, and importance of the magnetic storage apparatus is increasing. In addition, in the magnetic recording medium such as a magnetic disk, the recording density is increasing at a rate of over 50% per year, and this trend may be expected to continue in the future. With this trend of increasing recording density, magnetic heads and magnetic recording media suited for the high recording density are being developed.

The magnetic storage apparatus may be provided with the so-called perpendicular magnetic recording medium in which an axis of easy magnetization within a recording layer is mainly oriented in a perpendicular direction. In the perpendicular magnetic recording medium, the effects of demagnetization is small in a boundary region between recorded bits, and a sharp bit boundary may be formed, to thereby suppress increase of noise, even when the recording density is high. In addition, in the perpendicular magnetic recording medium, the decrease in the recording bit volume caused by the high recording density is small, and the thermal stability of written bits (or characteristic to withstand heat fluctuation) may be improved. The thermal stability of written bits may also be simply referred to as "thermal stability".

In order to cope with the demands to further improve the high recording density of the magnetic recording medium, studies are being made to use a single-pole head having a desirable write performance with respect to the perpendicular recording layer. More particularly, a proposed magnetic recording medium is provided with a back layer made of a soft magnetic material between the perpendicular recording layer and a nonmagnetic substrate, in order to improve the input and output efficiency of magnetic flux between the single-pole magnetic head and the magnetic recording medium.

In the conventional magnetic disk, a servo information region recorded with servo information, and a data region to which data are recorded and from which the data are reproduced, are provided on the same plane, that is, in the same recording layer. On the other hand, Japanese Laid-Open Patent Publication No. 2003-228801 proposes a system that forms the recording layer of the magnetic disk from a lower layer part and an upper layer part having a coercivity lower than that of the lower layer part, and records the servo information in the lower layer part having the higher coercivity and records the data in the upper layer part having the lower coercivity. According to this proposed system, the servo information region recorded with the servo information, and the data region to which data are recorded and from which the data are reproduced, may be provided in separate recording layers. In this case, the servo information region and the data region may overlap in a plan view of the magnetic disk, and the data region may be increased compared to a case in which the servo information region and the data region are provided in the same recording layer.

On the other hand, in the magnetic disk used in the HDD that is an example of the magnetic storage apparatus, the recording of the servo information is performed only once in many cases. This recording is performed by a dedicated STW (Servo Track Writer) used by a manufacturer of the HDD. However, according to the conventional recording system that uses the STW, it is difficult to increase the track density of the magnetic disk that is to be recorded with the servo information in the lower layer part having the coercivity than the upper layer part in the recording layer, for the following reasons. That is, because a distance between the magnetic head and the lower layer part is relatively long, the intensity of the magnetic field output from the magnetic head and reaching the lower layer part becomes low, and the recording characteristic of the magnetic head with respect to the lower layer part deteriorates. In other words, because the coercivity of the lower layer part of the recording layer is high compared to that of the upper layer part of the recording layer, the deterioration of the recording characteristic of the magnetic head becomes notable.

In order to improve the recording characteristic of the magnetic head, it is necessary to increase the intensity of the magnetic field output from the magnetic head, however, there is a limit to increasing the intensity of the magnetic field that may be output from the magnetic head. In addition, when a width of a recording element of the magnetic head is made wide in order to increase the intensity of the magnetic field, it becomes difficult to record on a narrow track, and the track density deteriorates to thereby deteriorate the recording density of the data region.

Furthermore, when the distance between the magnetic head and the lower layer part of the recording layer increases, the magnetic field from the magnetic head spreads to the outside and makes the recording on the narrow track difficult. In this case, the track density also deteriorates to thereby deteriorate the recording density of the data region.

Therefore, according to the magnetic storage apparatus, such as the HOD, it is becoming difficult to improve the track density in the data region of the magnetic recording medium in order to improve the recording capacity.

SUMMARY OF THE INVENTION

Embodiments of the present invention may provide a servo information recording method and a magnetic storage apparatus that may improve the track density in the data region of the magnetic recording medium in order to improve the recording capacity.

According to one aspect of the present invention, a servo information recording method may include continuously recording, by a magnetic head, servo information in a radial direction of a magnetic disk on a plurality of concentric tracks or on a single spiral track of a first recording layer that forms a magnetic layer of the magnetic disk together with a second recording layer to which data are recorded and from which data are reproduced, wherein the first recording layer has a coercivity higher than that of the second recording layer; and partially overlapping two mutually adjacent tracks when continuously recording the servo information on an entire surface of the first recording layer in the radial direction from an inner peripheral side towards an outer peripheral side of the magnetic disk, or from the outer peripheral side towards the inner peripheral side of the magnetic disk, wherein a distance between the magnetic head and the first recording layer is longer than a distance between the magnetic head and the second recording layer during the continuously recording.

According to another aspect of the present invention, a magnetic storage apparatus may include the magnetic disk recorded with the servo information by the servo information recording method described above; the magnetic head configured to reproduce the servo information from the first recording layer of the magnetic disk, and to record data to or reproduce data from the second recording layer of the magnetic disk; and a signal processing part configured to perform a signal processing on input data to supply a recording signal to the magnetic head, and to perform a signal processing on a signal reproduced from the magnetic disk by the magnetic head to supply reproduced data to an outside of the magnetic storage apparatus.

Other objects and further features of the present invention will be apparent from the following detailed description when read in conjunction with the accompanying drawings.

BRIEF DESCRIPTION OF THE DRAWINGS

FIG. 10 is a block diagram illustrating a part of the magnetic storage apparatus.

DESCRIPTION OF THE PREFERRED EMBODIMENTS

Figure 1:
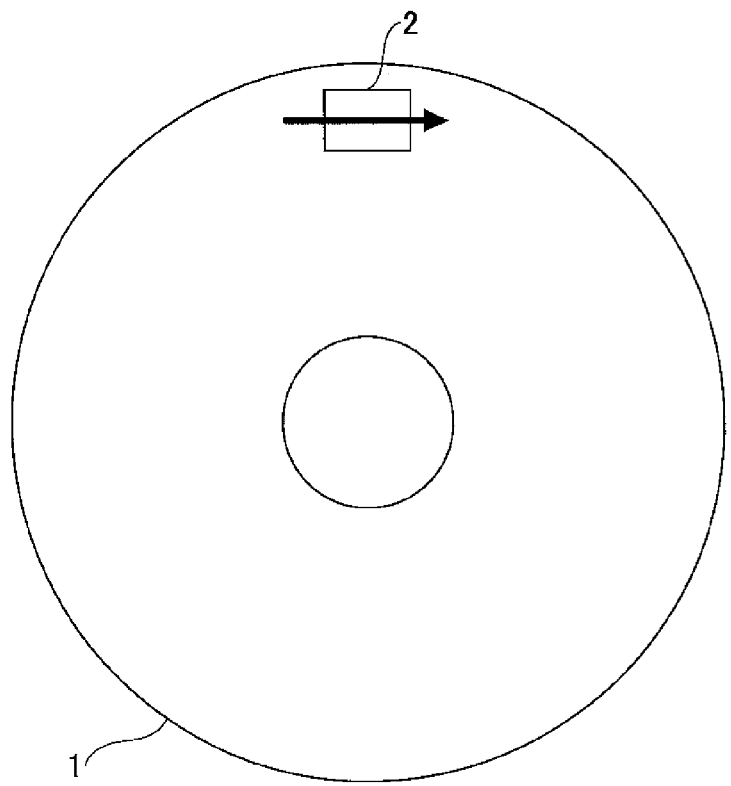
FIG. 1 is a plan view illustrating an example of a magnetic disk.

A description will be given of the servo information recording method and the magnetic storage apparatus in each embodiment of the present invention, by referring to the drawings.

In magnetic recording mediums such as magnetic disks, there are demands to further increase the recording density in order to improve the recording capacity. In a general magnetic disk, a servo information region recorded with servo information, and a data region to which information (or data) is recorded and from which the data are reproduced, are provided in independent regions of a recording surface. A magnetic head may detect its position by reproducing the servo information from the servo information region, and may move the magnetic head to a specified position where the data are to be recorded or reproduced depending on the detected position, in order to record or reproduce the data. For this reason, the servo information region occupies a relatively large portion of the magnetic disk, and prevents the recording capacity (that is, the data recordable recording capacity) of the magnetic disk from being further improved.

In one embodiment of the present invention, a magnetic layer, forming the recording layer of the magnetic disk, may be formed by a lower (or first) recording layer, and an upper (or second) recording layer having a coercivity lower than that of the lower recording layer. The servo information is recorded in the lower recording layer having the higher coercivity, and the data are recorded in and reproduced from the upper recording layer having the lower coercivity. The servo information region and the data region may overlap in a plan view of the magnetic disk, and the data region may be increased compared to the case in which the servo information region and the data region are provided in the same recording layer. The servo info/notion and the data may be recorded at mutually different recording frequencies, so that the servo information and the data may be reproduced simultaneously from the magnetic disk. At the time of the reproduction, the servo information and the data may be separated depending on the respective frequency bands.

However, when a distance between the magnetic head and the lower recording layer is relatively long, the intensity of the magnetic field output from the magnetic head and reaching the lower magnetic layer becomes low, and the recording characteristic of the magnetic head with respect to the lower recording layer deteriorates. Particularly because the coercivity of the lower recording layer is high compared to that of the upper recording layer, the deterioration of the recording characteristic of the magnetic head becomes notable. In order to improve the recording characteristic of the magnetic head, it is necessary to increase the intensity of the magnetic field output from the magnetic head, however, there is a limit to increasing the intensity of the magnetic field that may be output from the magnetic head. In addition, when a width of a recording element of the magnetic head is made wide in order to increase the intensity of the magnetic field, it becomes difficult to record on a narrow track, and the track density deteriorates to thereby deteriorate the recording density of the data region. Furthermore, when the distance between the magnetic head and the lower recording layer increases, the magnetic field from the magnetic head spreads and makes the recording on the narrow track difficult. In this case, the track density also deteriorates to thereby deteriorate the recording density of the data region.

Accordingly, in order to improve the track density of the data region and improve the recording density, the servo information in one embodiment of the present invention is recorded continuously for the entire recording surface of the magnetic disk, for example, in a radial direction from an inner peripheral side towards an outer peripheral side of a magnetic disk, or from the outer peripheral side towards the inner peripheral side of the magnetic disk, on a plurality of concentric (or ring-shaped) tracks or on a single spiral track. In addition, when recording the servo information on the concentric tracks or the single spiral track, the servo information is recorded to partially overlap the servo information recorded in an adjacent track recorded immediately before.

Figure 2:
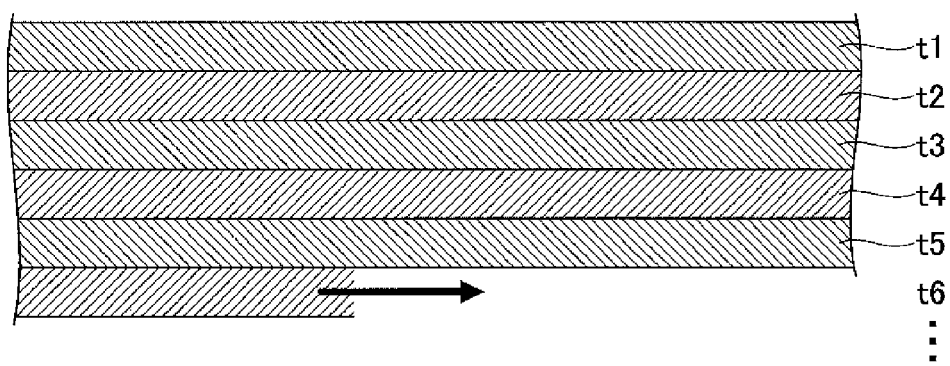
FIG. 2 is a diagram for explaining recording of servo information to the magnetic disk in a comparison example.

First, a description will be given of the servo information recording method in one embodiment, by referring to FIGS. 1 through 3. FIG. 1 is a plan view illustrating an example of the magnetic disk. FIG. 2 is a diagram for explaining the recording of the servo information to the magnetic disk in a comparison example, and FIG. 3 is a diagram for explaining the recording of the servo information to the magnetic disk in one embodiment.

Figure 3:
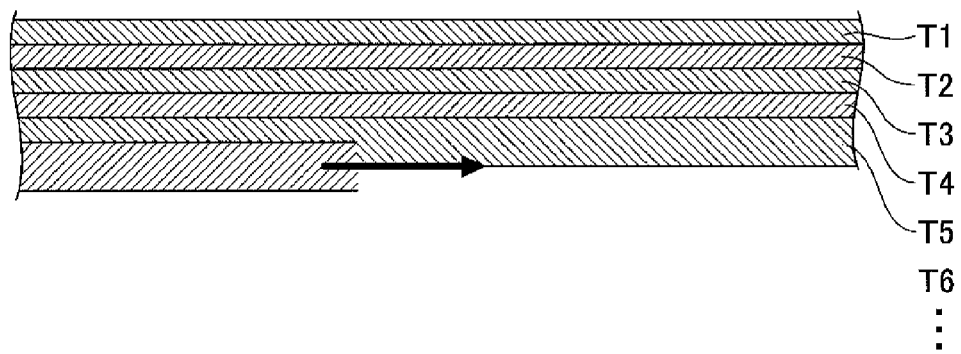
FIG. 3 is a diagram for explaining recording of the servo information to the magnetic disk in one embodiment.

In FIGS. 1 through 3, a bold arrow indicates a recording position and a recording direction of a magnetic head (not illustrated) of an STW, for example, which records the servo information on a magnetic disk 1. More particularly, the bold arrow indicates a center position of the magnetic head with respect to a servo track that is being recorded. FIGS. 2 and 3 schematically illustrate the servo track of the servo information recorded within a rectangular region 2 of the magnetic disk 1 illustrated in FIG. 1.

FIG. 2 illustrates servo tracks t1, t2, t3, t4, t5, t6, . . . that are sequentially recorded with the servo information, continuously in the radial direction from the outer peripheral side towards the inner peripheral side of the magnetic disk 1, for example, on the plurality of concentric tracks or on the single spiral track, when the comparison example employs a conceivable servo track recording system. The servo tracks t1, t2, t3, t4, t5, t6, . . . are formed so as not to interfere with the adjacent tracks.

FIG. 3 illustrates servo tracks T1, T2, T3, T4, T5, T6, . . . that are sequentially recorded with the servo information, continuously in the radial direction from the outer peripheral side towards the inner peripheral side of the magnetic disk 1, for example, on the plurality of concentric tracks or on the single spiral track, when a servo track recording system of the embodiment is employed. The servo tracks t1, t2, t3, t4, t5, t6, . . . are formed so that two mutually adjacent tracks partially overlap each other.

In both the cases illustrated in FIGS. 2 and 3, the servo information is recorded with the same recording characteristic in the lower recording layer of the magnetic layer that is formed by the upper recording layer and the lower recording layer. On the other hand, the data are recorded in the upper recording layer with a recording characteristic that is different from that used to record the servo information in the lower recording layer.

In order to improve the recording characteristic of the magnetic head, it is necessary to increase the intensity of the magnetic field output from the magnetic head, however, there is a limit to increasing the intensity of the magnetic field that may be output from the magnetic head. In addition, when the width of the recording element of the magnetic head is made wide in order to increase the intensity of the magnetic field, it becomes difficult to record on a narrow track, and the track density deteriorates to thereby deteriorate the recording density of the data region. Furthermore, when the distance between the magnetic head and the lower recording layer increases, the magnetic field from the magnetic head spreads and makes the recording on the narrow track difficult. In this case, the track density also deteriorates to thereby deteriorate the recording density of the data region.

Accordingly, in the case illustrated in FIG. 2, it is difficult to improve the track density in the data region of the magnetic disk 1 and improve the recording capacity.

On the other hand, in the case illustrated in FIG. 3, the servo tracks T1, T2, T3, T4, T5, T6, . . . are formed so that two mutually adjacent tracks partially overlap each other. When forming the servo track T6, for example, the servo track T6 is formed to partially overlap the servo track T5 that is formed immediately before the servo track T6, and the density of the servo track along the radial direction of the magnetic disk 1 may be improved compared to the case illustrated in FIG. 2. For example, an amount of overlap between the two mutually adjacent tracks may be greater than zero (0) and less than or equal to ½ the width of one servo track (or the width of the magnetic head (recording element) of the STW). As a result in the case illustrated in FIG. 3, when controlling the magnetic head based on the servo information recorded in the servo track of the lower recording layer and recording the data in the upper recording layer, the density of the data tracks along the radial direction may be improved and the recording capacity of the magnetic disk 1 may be improved compared to the case illustrated in FIG. 2.

In one embodiment of the present invention, when forming the servo track, the servo track is formed to partially overlap the adjacent servo track that is formed immediately before, as described above. However, the amount of overlap (or overlapping width) is preferably as wide as possible within a range that enables the magnetic head to read the servo information from the servo track that is finally formed, from the point of view of improving the track density of the servo tracks.

The magnetic storage apparatus in one embodiment may include the magnetic disk recorded with the servo information in the lower recording layer as described above in conjunction with FIG. 3, the magnetic head to reproduce the servo information from the lower recording layer and to record the data in or to reproduce the data from the upper recording layer of the magnetic disk, and a signal processing system to process the reproduced signal output from the magnetic head or to process a recording signal input to the magnetic head.

Next, a description will be given of the magnetic disk, the servo information recording method, the magnetic storage apparatus, and the data recording and reproducing method with respect to the magnetic disk, in each embodiment of the present invention, by referring to FIG. 4 and the subsequent figures.

(Magnetic Recording Medium)

Figure 4:
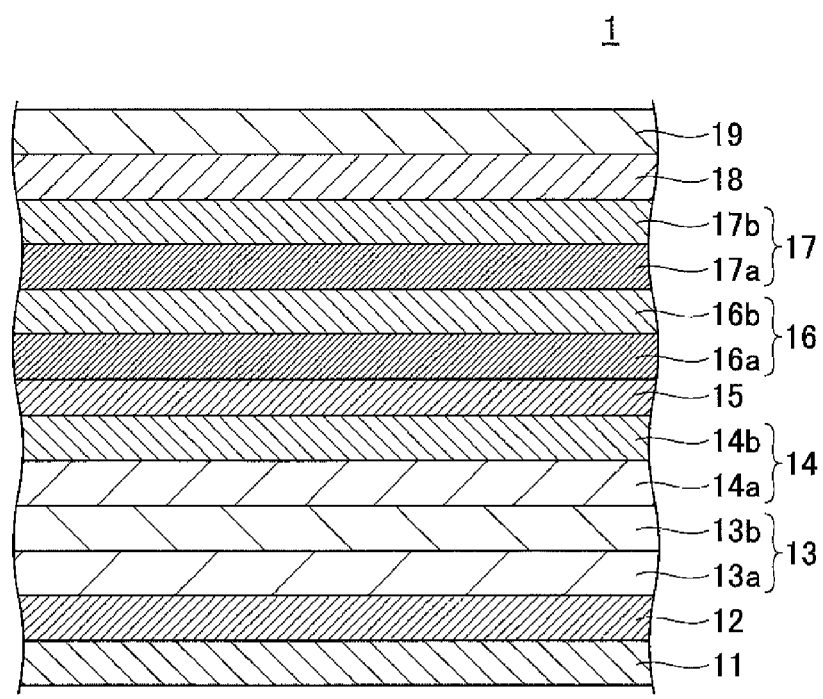
FIG. 4 is a cross sectional view illustrating a structure of a part of an example of a magnetic recording medium in one embodiment of the present invention.

FIG. 4 is a cross sectional view illustrating a structure of a part of an example of the magnetic recording medium in one embodiment of the present invention. In FIG. 4, the thickness of each layer is not illustrated on a scale in proportion to actual dimensions. The magnetic disk 1 illustrated in FIG. 4 is an example of the magnetic recording medium.

As illustrated in FIG. 4, the magnetic disk 1 may include a first soft magnetic layer (or underlayer) 12, an orientation control layer 13, a lower recording layer 14, a second soft magnetic layer 15, an intermediate layer 16, an upper recording layer 17, and a protection layer 18 that are sequentially stacked in this order on a nonmagnetic substrate 11, for example. A lubricant layer 19 may be provided on the protection layer 18. The orientation control layer 13 may include a first orientation control layer 13a and a second orientation control layer 13b. The lower recording layer 14 may include a first lower recording layer 14a and a second lower recording layer 14b. The intermediate layer 16 may include a first intermediate layer 16a and a second intermediate layer 16b. The upper recording layer 17 may include a first upper recording layer 17a and a second upper recording layer 17b. In this example, the upper recording layer 17 and the lower recording layer 14 sandwiching the second soft magnetic layer 15 and the intermediate layer 16 form a perpendicular recording layer (or perpendicular magnetic layer).

(Nonmagnetic Substrate)

The nonmagnetic substrate 11 may be formed by a metal substrate formed by a metal material such as aluminum and aluminum alloy, a non-metal substrate formed by a non-metal material such as glass, ceramics, silicon, silicon carbide and carbon, and the like. In addition, the nonmagnetic substrate 11 may be formed with a NiP layer or a NiP alloy layer on the surface of the metal substrate or the non-metal substrate, by plating, sputtering, and the like.

Corrosion of the nonmagnetic substrate 11 may occur when the nonmagnetic substrate 11 makes contact with the first soft magnetic layer 12 having Co or Fe as its main component, due to absorption gas at the surface of the nonmagnetic substrate 11, the effects of moisture, the diffusion of the substrate component, and the like. The main component of an alloy refers to an element having a largest amount within the alloy. From the point of view of preventing the corrosion, a bonding layer (not illustrated) may preferably be provided between the nonmagnetic substrate 11 and the first soft magnetic layer 12. The bonding layer may be made of Cr, Cr alloy, Ti, Ti alloy, and the like. The bonding layer may preferably have a thickness of 2 nm (20 Å) or greater. The bonding layer may be formed by sputtering and the like.

(First Soft Magnetic Underlayer)

The first soft magnetic layer 12 may be formed on the nonmagnetic substrate 11. The method of forming the first soft magnetic layer 12 is not limited to a particular method, and for example, sputtering and the like may be used.

The first soft magnetic layer 12 may be provided in order to increase a perpendicular direction component of the magnetic flux generated from the magnetic head (not illustrated) which will be described later with respect to the surface (hereinafter also referred to as a "substrate surface") of the nonmagnetic substrate 11, and to strongly fix (or pin) the magnetization direction of the perpendicular magnetic layer on which the information is recorded in the direction perpendicular with respect to the nonmagnetic substrate 11. Such functions of the first soft magnetic layer 12 may be particularly notable when the single-pole magnetic head for the perpendicular recording is used for the recording and reproducing magnetic head.

The first soft magnetic layer 12 may be formed by Fe or a soft magnetic material including Ni, Co, and the like. The soft magnetic material may include CoFe alloys, FeCo alloys, FeNi alloys, FeAl alloys, FeCr alloys, FeTa alloys, FeMg alloys, FeZr alloys, FeC alloys, FeN alloys, FeSi alloys, FeP alloys, FeNb alloys, FeHf alloys, FeB alloys, and the like. The CoFe alloys may include CoFeTaZr, CoFeZrNb, and the like. The FeCo alloys may include FeCo, FeCoV, and the like. The FeNi alloys may include FeNi, FeNiMo, FeNiCr, FeNiSi, and the like. The FeAl alloys may include FeAl, FeAlSi, FeAlSiCr, FeAlSiTiRu, FeAlO, and the like. The FeCr alloys may include FeCr, FeCrTi, FeCrCu, and the like. The FeTa alloys may include FeTa, FeTaC, FeTaN, and the like. The FeMg alloys may include FeMgO and the like, and the FeZr alloys may include FeZrN and the like.

In addition, the first soft magnetic layer 12 may be formed by a material such as FeAlO, FeMgO, FeTaN, FeZrN and the like having an Fe-content of 60 at % or higher and a microcrystal structure, or a material having a granular structure in which the microcrystal particles are dispersed within the matrix.

Furthermore, the first soft magnetic layer 12 may be formed by a Co alloy having a Co-content of 80 at % or higher, including at least one of Zr, Nb, Ta, Cr, Mo and the like, and having an amorphous structure. The Co alloy having the amorphous structure may include alloys of CoZr, CoZrNb, CoZrTa, CoZrCr, CoZrMo and the like.

The first soft magnetic layer 12 may preferably formed by two soft magnetic layers (not illustrated), and may preferably be provided with a Ru layer (not illustrated) between the two soft magnetic layers. By adjusting the thickness of the Ru layer in a range of 0.4 nm to 1.0 nm, or in a range of 1.6 nm to 2.6 nm, the two soft magnetic layers form an AFC (Anti-Ferromagnetically-Coupled) structure, to thereby enable suppression of the so-called spike noise.

(Orientation Control Layer)

The orientation control layer 13 may be formed on the first soft magnetic layer 12. The orientation control layer 13 may be provided in order to reduce the crystal particle size of the lower recording layer 14 and improve recording and reproducing characteristics. As illustrated in FIG. 4, the orientation control layer 13 in this embodiment may include the first orientation control layer 13a arranged on the side of the first soft magnetic layer 12, and the second orientation control layer 13b arranged on the first orientation control layer 13a on the side of the lower recording layer 14.

The first orientation control layer 13a may be provided in order to increase a nucleation density of the orientation control layer 13, and may include crystals that become nuclei of the columnar crystals forming the orientation control layer 13. In the first orientation control layer 13a of this embodiment, a dome-shaped projection may be formed at a peak part of a columnar crystal S1 grown from the crystal that become the nucleus, as will be described later in conjunction with FIG. 5.

The first orientation control layer 13a may preferably have a thickness of 3 nm or greater. When the thickness of the first orientation control layer 13a is less than 3 nm, the effect of increasing the orientation of the lower recording layer 14 and reducing the size of magnetic particles 42 of the lower recording layer 14 may become insufficient, and a satisfactory SNR may be difficult to obtain.

The first orientation control layer 13a may preferably be formed by a Ru alloy layer that includes a magnetic material and has a saturation magnetization of 50 emu/cc or higher. When the first orientation control layer 13a is formed by a Ru alloy layer that includes a magnetic material but has a saturation magnetization lower than 50 emu/cc, and the second orientation control layer 13b which will be described later is not made of a Ru layer that includes a magnetic material and has a saturation magnetization of 50 emu/cc or higher, a sufficiently high recording characteristic (or OW (Over-Write) characteristic) suited for the high-density recording may be difficult to obtain.

The second orientation control layer 13b may preferably be formed by a Ru alloy layer that includes a magnetic material and has a saturation magnetization of 50 emu/cc or higher. When the second orientation control layer 13b is formed by a Ru alloy layer that includes a magnetic material but has a saturation magnetization lower than 50 emu/cc, and the first orientation control layer 13b described above is not made of a Ru layer that includes a magnetic material and has a saturation magnetization of 50 emu/cc or higher, a sufficiently high recording characteristic (or OW characteristic) suited for the high-density recording may be difficult to obtain.

The Ru alloy layer included in the second orientation control layer 13b may be similar to the Ru alloy layer included in the first orientation control layer 13a.

The Ru alloy layer included in the second orientation control layer 13b may be made of the same material as the Ru alloy layer included in the first orientation control layer 13a, or may be made of a material different from that of the first orientation control layer 13a. More particularly, one of the first and second orientation control layers 13a and 13b may be formed by a CoRu alloy layer, and the other of the first and second orientation control layers 13a and 13b may be formed by a FeRu alloy layer, for example.

The second orientation control layer 13b may preferably be formed by sputtering in which the sputtering gas pressure is higher than that used to sputter the first orientation control layer 13a and is within a range of 5 Pa to 18 Pa. When the sputtering gas pressure for the second orientation control layer 13b is in the range of 5 Pa to 18 Pa, the second orientation control layer 13b including the columnar crystals S2 having the dome-shaped projection formed at the peak part thereof may be formed with ease in continuous with (that is, in a continuous manner to) the columnar crystals S1 included in the first orientation control layer 13a and forming the nuclei of the crystals, in the thickness direction.

When the sputtering gas pressure for the second orientation control layer 13b is less than 5 Pa, the effect of isolating the crystal particles of the lower recording layer 14 grown on the orientation control layer 13 and reducing the magnetic particle size of the perpendicular magnetic layer may be insufficient, and it may be difficult to obtain satisfactory SNR and thermal stability. On the other hand, when the sputtering gas pressure for the second orientation control layer 13b exceeds 18 Pa, the hardness of the second orientation control layer 13b may be insufficient.

Figure 5:
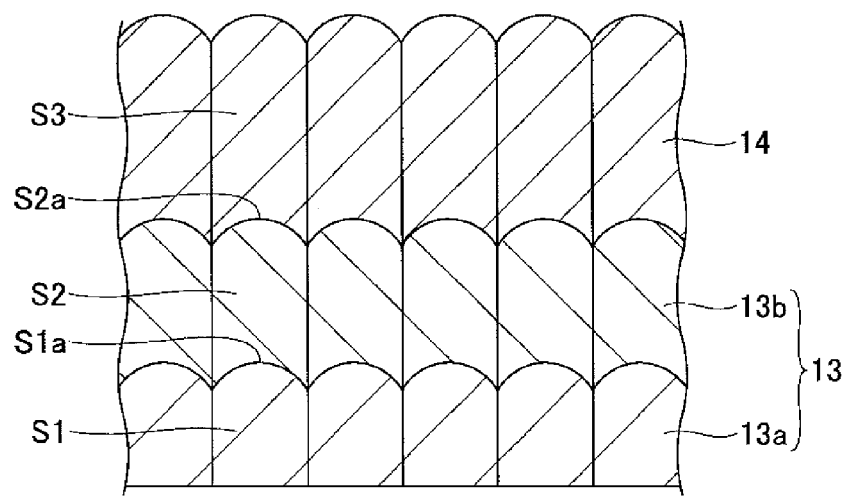
FIG. 5 is a cross sectional view, on an enlarged scale, illustrating a state in which columnar crystals of an orientation control layer and a lower recording layer are grown perpendicularly with respect to a substrate surface.

Next, a description will be given of a relationship between the crystal particles forming the orientation control layer 13 and the magnetic particles forming the lower recording layer 14 in the magnetic disk 1, by referring to FIG. 5. FIG. 5 is a cross sectional view, on an enlarged scale, illustrating a state in which columnar crystals of an orientation control layer 13 and the lower recording layer 14 are grown perpendicularly to the substrate surface. In FIG. 5, the illustration of parts of the magnetic disk 1 other than the first and second orientation control layers 13a and 13b forming the orientation control layer 13, and the lower recording layer 14, is omitted.

As illustrated in FIG. 5, a concavo-convex surface S1a may be formed on the first orientation control layer 13a by the dome-shaped projections at the peak parts of the columnar crystals S1 forming the first orientation control layer 13a. The columnar crystals S2 of the crystal particles forming the second orientation control layer 13b may grow on the concavo-convex surface S1a of the first orientation control layer 13a, in the thickness direction. In addition, a concavo-convex surface S2a may be formed on the second orientation control layer 13b by the dome-shaped projections at the peak parts of the columnar crystals S2 forming the second orientation control layer 13b. Columnar crystals S3 of the crystal particles forming the lower recording layer 14 may grow on the columnar crystals S2 forming the second orientation control layer 13b, in the thickness direction. In this embodiment, because the crystal particles of the lower recording layer 14 grow on the dome-shaped projections of the second orientation control layer 13b, the isolation of the crystal particles of the perpendicular magnetic layer that are grown may be promoted, and the isolated crystal particles of the lower recording layer 14 may grow in the form of columnar crystals.

Hence, according to the magnetic disk 1 in this embodiment, the columnar crystals S2 of the second orientation control layer 13b and the columnar crystals S3 of the lower recording layer 14 may grow epitaxially as continuous columnar crystals on the columnar crystals S1 of the first orientation control layer 13a. In this embodiment, the lower recording layer 14 has the multi-layer structure, as illustrated in FIG. 1. The crystal particles forming each of the layers 14a and 14b of the lower recording layer 14 having the multi-layer structure may repeatedly grow epitaxially in the form of continuous columnar crystals, from the orientation control layer 13 up to the second lower recording layer 14b on the upper side of the lower recording layer 14. Hence, in this embodiment, the size of the crystal particles forming the first orientation control layer 13a may be reduced and the density of the columnar crystals S1 may be increased. For this reason, the densities of the columnar crystals S2 of the second orientation control layer 13b that grow from the peak parts of the columnar crystals S1 in the thickness direction, and the columnar crystals S3 of the lower recording layer 14 having the multi-layer structure that grow from the peak parts of the columnar crystals S2 in the thickness direction, may be increased.

(Lower Recording Layer)

The lower recording layer 14 may be formed on the orientation control layer 13. As illustrated in FIG. 4, the lower recording layer 14 in this embodiment may include, from the side of the nonmagnetic substrate 11, the first lower recording layer 14a and the second lower recording layer 14b. The crystal particles forming each of the first and second lower recording layers 14a and 14b may grow epitaxially in the form of columnar crystals in continuous with the columnar crystals of the first and second orientation control layers 13a and 13b of the orientation control layer 13.

Figure 6:
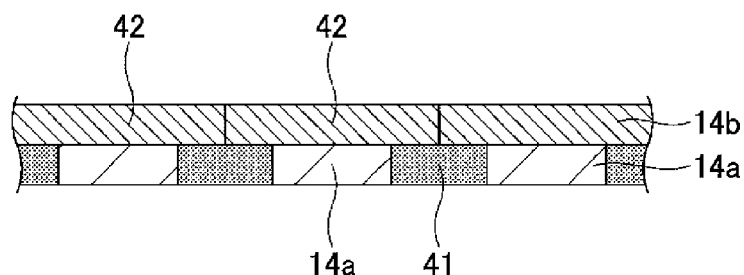
FIG. 6 is a cross sectional view, on an enlarged scale, illustrating a part of a stacked structure of magnetic layers forming the lower recording layer.

FIG. 6 is a cross sectional view, on an enlarged scale, illustrating a part of a stacked structure of the magnetic layers forming the lower recording layer 14. As illustrated in FIG. 6, the first lower recording layer 14a forming the lower recording layer 14 may have a granular structure preferably including magnetic particles (or magnetic crystal particles) 42 including Co, Cr and Pt, and an oxide 41. For example, Cr, Si, Ta, Al, Ti, Mg, Co, and the like may preferably be used for the oxide 41. In addition, $TiO_2$, $Cr_2O_3$, $SiO_2$, and the like may further preferably be used for the oxide 41. Moreover, the first lower recording layer 14a may preferably be formed by a composite oxide in which two or more kinds of oxides are added. The composite oxides may preferably use $Cr_2O_3$—$SiO_2$, $Cr_2O_3$—$TiO_2$, $Cr_2O_3$—$SiO_2$—$TiO_2$, and the like.

The magnetic particles 42 may preferably be dispersed within the first lower recording layer 14a. In addition, the magnetic particles 42 may preferably form a columnar structure that vertically penetrates the first and second lower recording layers 14a and 14b. Satisfactory orientation and crystal properties of the first lower recording layer 14a may be obtained by this columnar structure, and as a result, a SNR suited for the high-density recording may be obtained.

In order to obtain the lower recording layer 14 including the magnetic particles 42 with the columnar structure, it may be preferable to suitably set the content (or amount) of the oxide 41 included in the first lower recording layer 14a and the deposition condition of the first lower recording layer 14a. The content of the oxide 41 included in the first lower recording layer 14a may preferably be 3 mol % or higher and 18 mol % or lower, and more preferably be 6 or higher and 13 mol % or lower, with respect to a mol total calculated using an alloy of Co, Cr, Pt, and the like forming the magnetic particles 42 as one compound. The content of the oxide 41 in the first lower recording layer 14a may preferably be in the range of the mol % described above, because the oxide 41 precipitates in the periphery of the magnetic particles 42 when the first lower recording layer 14a is formed and the isolation and size reduction of the magnetic particles 42 may be achieved.

On the other hand, when the content of the oxide 41 in the first lower recording layer 14a exceeds 18 mol %, the oxide 41 may remain within the magnetic particles 42 to deteriorate the orientation and crystal properties of the magnetic particles, and the oxide 41 may precipitate above and below the magnetic particles 42 to make it difficult for the columnar structure vertically penetrating the first and second lower recording layers 14a and 14b to be formed, which may be undesirable. On the other hand, when the content of the oxide 41 in the first lower recording layer 14a is lower than 3 mol %, the isolation and size reduction of the magnetic particles 42 may become insufficient, to increase the noise at the time of the recording and reproduction and make it difficult to obtain the SNR suited for the high-density recording, which may be undesirable.

The Cr-content in the first lower recording layer 14a may preferably be 4 at % or higher and 19 at % or lower, and more preferably be 6 at % or higher and 17 at % or lower. When the Cr-content in the first lower recording layer 14a is in a range of 4 at % or higher and 19 at % or lower, a magnetic anisotropy constant Ku of the magnetic particles 42 does not become excessively small and the high magnetization may be maintained, and thus, the recording and reproducing characteristics suited for the high-density recording and the sufficiently high thermal stability may be obtained.

On the other hand, when the Cr-content in the first lower recording layer 14a exceeds 19 at %, the magnetic anisotropy constant Ku of the magnetic particles 42 may become small, the thermal stability may deteriorate, and the crystal properties and the orientation of the magnetic particles 42 may deteriorate. As a result, the recording and reproducing characteristics may deteriorate, which may be undesirable. On the other hand, when the Cr-content in the first lower recording layer 14a is lower than 4 at %, the magnetic anisotropy constant Ku may become large and the perpendicular coercivity may become excessively high, to prevent the magnetic head from sufficiently writing the data. In this case, the recording characteristic (or OW characteristic) may become unsuited for the high-density recording, which may be undesirable.

The Pt-content in the first lower recording layer 14a may preferably be 8 at % or higher and 20 at % or lower. When the Pt-content in the first lower recording layer 14a is lower than 8 at %, a sufficiently large magnetic anisotropy constant Ku required by the lower recording layer 14 in order to obtain the thermal stability suited for the high-density recording may be difficult to obtain, which may be undesirable. On the other hand, when the Pt-content in the first lower recording layer 14a exceeds 20 at %, a stacking defect may occur within the magnetic particles 42, to decrease the magnetic anisotropy constant Ku. In addition, when the Pt-content in the first lower recording layer 14a exceeds 20 at %, a layer having a fcc (face-centered cubic) structure may be formed within the magnetic particles 42, to deteriorate the crystal properties and the orientation, which may be undesirable. Accordingly, in order to obtain the thermal stability and the recording and reproducing characteristics that are suited for the high-density recording, the Pt-content in the first lower recording layer 14a may preferably be in a range of 8 at % or higher and 20 at % or lower.

The magnetic particles 42 of the first lower recording layer 14a may include one or more kinds of elements selected from B, Ta, Mo, Cu, Nd, W, Nb, Sm, Tb, Ru, and Re, in addition to Co, Cr, and Pt. By additionally including such one or more kinds of elements in the magnetic particles 42, the size reduction of the magnetic particles 42 may be promoted, and the crystal properties and the orientation may be improved. As a result, the recording and reproducing characteristics and the thermal stability, that are suited for the high-density recording, may be obtained.

A total amount of the one or more kinds of elements added to Co, Cr, and Pt within the magnetic particles 42 of the first lower recording layer 14a may preferably be 8 at % or lower. When the total amount of the one or more kinds of elements added to Co, Cr, and Pt within the magnetic particles 42 exceeds 8 at %, a phase other than the hcp structure may be formed within the magnetic particles 42, to deteriorate the crystal properties and the orientation of the magnetic particles 42, and prevent the recording and reproducing characteristics and the thermal stability that are suited for the high-density recording from being obtained, which may be undesirable.

For example, the material suited for the first lower recording layer 14a may include 90(Co14Cr18Pt)-10($SiO_2$) {mol concentration of 90 mol % calculated using magnetic particles having a Cr-content of 14 at %, a Pt-content of 18 at %, and the remainder Co as one compound, and 10 mol % of an oxide component having $SiO_2$}, 92(Co10Cr16Pt)-8($SiO_2$), 94(Co8Cr14Pt4Nb)-6($Cr_2O_3$), (CoCrPt)—($Ta_2O_5$), (CoCrPt)—($Cr_2O_3$)—($TiO_2$), (CoCrPt)—($Cr_2O_3$)—($SiO_2$), (CoCrPt)—($Cr_2O_3$)—($SiO_2$)—($TiO_2$), (CoCrPtMo)—(TiO), (CoCrPtW)—($TiO_2$), (CoCrPtB)—($Al_2O_3$), (CoCrPtTaNd)—(MgO), (CoCrPtBCu)—($Y_2O_3$), (CoCrPtRu)—($SiO_2$), and the like.

As illustrated in FIG. 6, the second lower recording layer 14b forming the lower recording layer 14 may include magnetic particles (or magnetic crystal particles) 42 that include Co and Cr, and may preferably include no oxide 41. The magnetic particles 42 of the second lower recording layer 14b may preferably grow epitaxially on the magnetic particles 42 of the first lower recording layer 14a in the form of columnar crystals. In this case, the magnetic particles 42 of the first lower recording layer 14a and the magnetic particles 42 of the second lower recording layer 14b may preferably correspond 1:1 and grow epitaxially in the form of the columnar crystals. When the magnetic particles 42 of the second lower recording layer 14b grow epitaxially on the magnetic particles 42 of the first lower recording layer 14a in the form of the columnar crystals, the particle size of the magnetic particles 42 in the second lower recording layer 14b may be reduced, and the crystal properties and the orientation of the second lower recording layer 14b may be improved.

A Cr-content in the second lower recording layer 14b may preferably be 10 at % or higher and 24 at % or lower. When the Cr-content in the second lower recording layer 14b is in a range of 10 at % or higher and 24 at % or lower, a sufficiently high output may be obtained at the time of a data reproduction, and a satisfactory thermal stability may be obtained. On the other hand, when the Cr-content in the second lower recording layer 14b exceeds 24 at %, the magnetization of the second lower recording layer 14b may become excessively small, which may be undesirable. In addition, when the Cr-content in the second lower recording layer 14b is lower than 10 at %, the isolation and size reduction of the magnetic particles 42 may become insufficient, to increase the noise at the time of the recording and reproduction and make it difficult to obtain the SNR suited for the high-density recording.

In addition, in a case in which the material used for the magnetic particles 42 forming the second lower recording layer 14b includes Pt in addition to Co and Cr, a Pt-content in the second lower recording layer 14b may preferably be 8 at % or higher and 20 at % or lower. When the Pt-content in the second lower recording layer 14b is in a range of 8 at % or higher and 20 at % or lower, a sufficient coercivity suited for the high-density recording may be obtained, and a high reproduced output may be maintained at the time of the reproduction. As a result, the recording and reproducing characteristics and the thermal stability that are suited for the high-density recording may be obtained. On the other hand, when the Pt-content in the second lower recording layer 14b exceeds 20 at %, the phase of the fcc structure may be formed in the second lower recording layer 14b, and the crystal properties and the orientation may deteriorate, which may be undesirable. On the other hand, when the Pt-content in the second lower recording layer 14b is lower than 8 at %, a sufficiently large magnetic anisotropy constant Ku required by the lower recording layer 14 in order to obtain the thermal stability suited for the high-density recording may be difficult to obtain, which may be undesirable.

The magnetic particles 42 of the second lower recording layer 14b may form a magnetic layer having a non-granular structure, and include one or more kinds of elements selected from B, Ta, Mo, Cu, Nd, W, Nb, Sm, Tb, Ru, Re, and Mn in addition to Co, Cr, and Pt. By additionally including such one or more kinds of elements in the magnetic particles 42, the size reduction of the magnetic particles 42 may be promoted, and the crystal properties and the orientation may be improved. As a result, the recording and reproducing characteristics and the thermal stability, that are suited for the high-density recording, may be obtained.

A total amount of the one or more kinds of elements added to Co, Cr, and Pt within the magnetic particles 42 of the second lower recording layer 14b may preferably be 16 at % or lower. When the total amount of the one or more kinds of elements added to Co, Cr, and Pt within the magnetic particles 42 exceeds 16 at %, a phase other than the hcp structure may be formed within the magnetic particles 42, to deteriorate the crystal properties and the orientation of the magnetic particles 42, and prevent the recording and reproducing characteristics and the thermal stability that are suited for the high-density recording from being obtained, which may be undesirable.

Preferable materials used for the second lower recording layer 14b may include CoCrPt alloys, CoCrPtB alloys, and the like. A total content of Cr and B in the CoCrPtB alloy may preferably be 18 at % or higher and 28 at % or lower.

Amongst preferable materials used for the second lower recording layer 14b, preferable CoCrPt alloys may include Co14~24Cr8~22Pt {Cr-content of 14 at %~24 at %, Pt-content of 8 at %~22 at %, and the remainder Co}, and preferable CoCrPtB alloys may include Co10~24Cr8~22Pt0~16B {Cr-content of 10 at %~24 at %, Pt-content of 8 at %~22 at %, B-content of 0~16 at %, and the remainder Co}. Further, amongst preferable materials used for the second lower recording layer 14b, preferable CoCrPtTa alloys may include Co10~24Cr8~22Pt1~5Ta1~10B {Cr-content of 10 at %~24 at %, Pt-content of 8 at %~22 at %, Ta-content of 1 at %~5 at %, and the remainder Co}, and preferable CoCrPtTaB alloys may include Co10~24Cr8~22Pt1~5Ta1~10B {Cr-content of 10 at %~24 at %, Pt-content of 8 at %~22 at %, Ta-content of 1 at %~5 at %, B-content of 1-10 at %, and the remainder Co}. Other suitable materials for the second lower recording layer 14b may include CoCrPtBNd alloys, CoCrPtTaNd alloys, CoCrPtNb alloys, CoCrPtBW alloys, CoCrPtMo alloys, CoCrPtCuRu alloys, CoCrPtRe alloys, and the like.

The magnetic disk 1 may include the lower recording layer 14 having a coercivity higher than that of the upper recording layer 17, and the upper recording layer 17 having a coercivity lower than that of the lower recording layer 14. The servo information may be recorded on the lower recording layer 14, and the data may be recorded and reproduced with respect to the upper recording layer 17. In a magnetic disk used in the HDD that is an example of the magnetic storage apparatus, the servo information may be written only once in many cases, and the servo information may be written by a dedicated STW (Servo Track Writer) used by a manufacturer of the HDD.

In this embodiment, it is assumed for the sake of convenience that the servo information is written to the lower recording layer 14 having the higher coercivity by the servo information recording method described above, using the magnetic head of the STW. On the other hand, the data are recorded on the upper recording layer 17 having the coercivity lower than that of the lower recording layer 14, and the data recording may be carried out by the manufacturer of the HDD or by a user of the HDD. The write and read with respect to the upper recording layer 17 may be made by a magnetic head of a general HDD, which has a write performance sufficient to write the data to the upper recording layer 17 but has a write performance lower than that of the magnetic head of the STW such that the write performance of the magnetic head of the HDD is insufficient to write the data to the lower recording layer 14.

A perpendicular coercivity (Hc) of the lower recording layer 14 may preferably be 3000 (Oe) or higher, and higher than the perpendicular coercivity (Hc) of the upper recording layer 17. When the perpendicular coercivity (Hc) of the lower recording layer 14 is lower than 3000 (Oe), the recording and reproducing characteristics, particularly the frequency characteristic deteriorates, to deteriorate the thermal stability, which may be undesirable for a high-density recording medium.

An average particle diameter of the magnetic particles 42 forming the lower recording layer 14 may preferably be 3 nm to 12 nm. The average particle diameter of the magnetic particles 42 may be obtained by observing the lower recording layer 14 by a TEM (Transmission Electron Microscope) and processing an image obtained by the TEM.

The lower recording layer 14 may preferably have a thickness of 5 nm to 20 nm. When the thickness of the lower recording layer 14 is less than 5 nm, it may be difficult to obtain a sufficient reproduced output, and the thermal stability may deteriorate. In addition, when the thickness of the lower recording layer 14 exceeds 20 nm, the particle size of the magnetic particles 42 within the lower recording layer 14 may increase and cause the noise at the time of the recording and reproduction to increase and deteriorate the recording and reproducing characteristics typified by the SNR and the recording characteristic (or OW characteristic), which may be undesirable.

The lower recording layer 14 may be formed by three or more magnetic layers. For example, a magnetic layer having a granular structure may further be provided in addition to the first and second lower recording layers 14a and 14b in order to form a three-layer granular structure, and a lower recording layer including no oxide may be provided on the three-layer granular structure. In addition, a lower recording layer including no oxide and having a two-layer structure may be provided on the first and second lower recording layers 14a and 14b.

(Second Soft Magnetic Layer)

The second soft magnetic layer 15 may preferably be formed on the lower recording layer 14. The method of forming the second soft magnetic layer 15 is not limited to a particular method, and for example, sputtering and the like may be used.

The second soft magnetic layer 15 may be provided in order to increase a perpendicular direction component of the magnetic flux generated from the magnetic head with respect to the substrate surface of the nonmagnetic substrate 11, and to strongly fix (or pin) the magnetization direction of the perpendicular magnetic layer on which the information is recorded in the direction perpendicular with respect to the nonmagnetic substrate 11. Such functions of the second soft magnetic layer 15 may be particularly notable when the single-pole magnetic head for the perpendicular recording is used for the recording and reproducing magnetic head.

When recording the servo information in the lower recording layer 14 having the higher coercivity and recording the data in the upper recording layer 17 having the lower coercivity, the upper recording layer 17 and the lower recording layer 14 are desirably provided with a separation in order to block the magnetic coupling between the upper recording layer 17 and the lower recording layer 14 that form the recording layer. As a result, the distance between the upper recording layer 17 of the recording layer and the first soft magnetic layer 12 becomes relatively long, to thereby deteriorate the input and output efficiency of magnetic flux between the magnetic head and the first soft magnetic layer 12. Hence, the second soft magnetic layer 12 is provided to aid or assist the function of the first soft magnetic layer 12, which deteriorates due to the deterioration of the input and output efficiency of the magnetic flux between the magnetic head and the first soft magnetic layer 12. As a result, it is possible to obtain the magnetic disk 1 having the recording and reproducing characteristics typified by the SNR and the recording characteristic (or OW characteristic), and the thermal stability that are suited for the high-density recording.

The material or composition forming the second soft magnetic layer 15 may be the same as, or be different from the material or composition forming the first soft magnetic layer 12 described above. In addition, the thickness of the second soft magnetic layer 15 may be the same as, or be different from the thickness of the first soft magnetic layer 12. The material or composition forming the second soft magnetic layer 15 and the thickness of the second soft magnetic layer 15 are not limited to particular material or composition and thickness, as long as the material or composition and thickness are suited to aid or assist the function of the first soft magnetic layer 12. However, when the second soft magnetic layer 15 is excessively thick, the distance between the lower recording layer 14 and the magnetic head increases, which may be undesirable. Hence, the second soft magnetic layer 15 may preferably be made as thin as possible but have a thickness that is sufficient to exhibit the above described aiding or assisting function of the second soft magnetic layer 15.

The second soft magnetic layer 15 may be formed by Fe or a soft magnetic material including Ni, Co, and the like. The soft magnetic material may include CoFe alloys, FeCo alloys, FeNi alloys, FaAl alloys, FeCr alloys, FeTa alloys, FeMg alloys, FeZr alloys, FeC alloys, FeN alloys, FeSi alloys, FeP alloys, FeNb alloys, FeHf alloys, FeB alloys, and the like. The CoFe alloys may include CoFeTaZr, CoFeZrNb, and the like. The FeCo alloys may include FeCo, FeCoV, and the like. The FeNi alloys may include FeNi, FeNiMo, FeNiCr, FeNiSi, and the like. The FeAl alloys may include FeAl, FeAlSi, FeAl-SiCr, FeAlSiTiRu, FeAlO, and the like. The FeCr alloys may include FeCr, FeCrTi, FeCrCu, and the like. The FeTa alloys may include FeTa, FeTaC, FeTaN, and the like. The FeMg alloys may include FeMgO and the like, and the FeZr alloys may include FeZrN and the like.

In addition, the second soft magnetic layer 15 may be formed by a material such as FeAlO, FeMgO, FeTaN, FeZrN and the like having an Fe-content of 60 at % or higher and a microcrystal structure, or a material having a granular structure in which the microcrystal particles are dispersed within the matrix.

Furthermore, the second soft magnetic layer 15 may be formed by a Co alloy having a Co-content of 80 at % or higher, including at least one of Zr, Nb, Ta, Cr, Mo and the like, and having an amorphous structure. The Co alloy having the amorphous structure may include alloys of CoZr, CoZrNb, CoZrTa, CoZrCr, CoZrMo and the like.

The second soft magnetic layer 15 may preferably formed by two soft magnetic layers (not illustrated), and may preferably be provided with a Ru layer (not illustrated) between the two soft magnetic layers. By adjusting the thickness of the Ru layer in a range of 0.4 nm to 1.0 nm, or in a range of 1.6 nm to 2.6 nm, the two soft magnetic layers form an AFC structure, to thereby enable suppression of the so-called spike noise.

(Intermediate Layer)

The intermediate layer 16 may be formed on the second soft magnetic layer 15. The intermediate layer 16 may be provided to block the magnetic coupling between the upper recording layer 17 and the lower recording layer 14 in order to prevent magnetization directions of the two recording layers 14 and 17 from affecting each other, and to reduce the crystal particle size of the upper recording layer 17 in order to improve the recording and reproducing characteristics. As illustrated in FIG. 4, the intermediate layer 16 in this embodiment may include a first intermediate layer 16a arranged on the side of the second soft magnetic layer 15, and a second intermediate layer 16b arranged on the side of the upper recording layer 17.

The first intermediate layer 16a may be provided to increase the nucleus generating density of the intermediate layer 16, and may include crystals that become the nuclei of the columnar crystals forming the intermediate layer 16. In the first intermediate layer 16a of this embodiment, a dome-shaped projection may be formed at a peak part of a columnar crystal S11 grown from the crystal that become the nucleus, as will be described later in conjunction with FIG. 7, in a manner similar to the first orientation control layer 13a illustrated in FIG. 5.

The first intermediate layer 16a may preferably have a thickness of 3 nm or greater. When the thickness of the first intermediate layer 16a is less than 3 nm, the effect of increasing the orientation of the upper recording layer 17 and reducing the size of magnetic particles 42 forming the upper recording layer 17 may become insufficient, and a satisfactory SNR may be difficult to obtain.

The first intermediate layer 16a may preferably be formed by a Ru alloy layer that includes a magnetic material and has a saturation magnetization of 50 emu/cc or higher. When the first intermediate layer 16a is formed by a Ru alloy layer that includes a magnetic material but has a saturation magnetization lower than 50 emu/cc, and the second intermediate layer 16b which will be described later is not made of a Ru layer that includes a magnetic material and has a saturation magnetization of 50 emu/cc or higher, a sufficiently high recording characteristic (or OW characteristic) suited for the high-density recording may be difficult to obtain.

The Ru alloy layer included in the first intermediate layer 16a may preferably include a magnetic material such as Co, Fe, or the like, and the Ru alloy layer may preferably be a CoRu alloy layer or a FeRu alloy layer. In a case in which the magnetic material included in the Ru alloy layer is Co, the Co-content included in the Ru alloy layer may preferably be 66 at % or higher. In addition, in a case in which the magnetic material included in the Ru alloy layer is Fe, the Fe-content included in the Ru alloy layer may preferably be 73 at % or higher. When the Co-content included in the Ru alloy layer is 66 at % or higher, or the Fe-content included in the Ru alloy layer is 73 at % or higher, a sufficient magnetization may be generated, and the saturation magnetization of the Ru alloy layer may be made 50 emu/cc or higher.

The saturation magnetization (Ms) of Co, CoRu alloy, and Fe used for the intermediate layer 16 may be similar to that of the orientation control layer 13 described above. In addition, the magnetic material content, the deposition method, the saturation magnetization, and the like of the intermediate layer 16 may be similar to those of the orientation control layer 13 described above.

Figure 7:
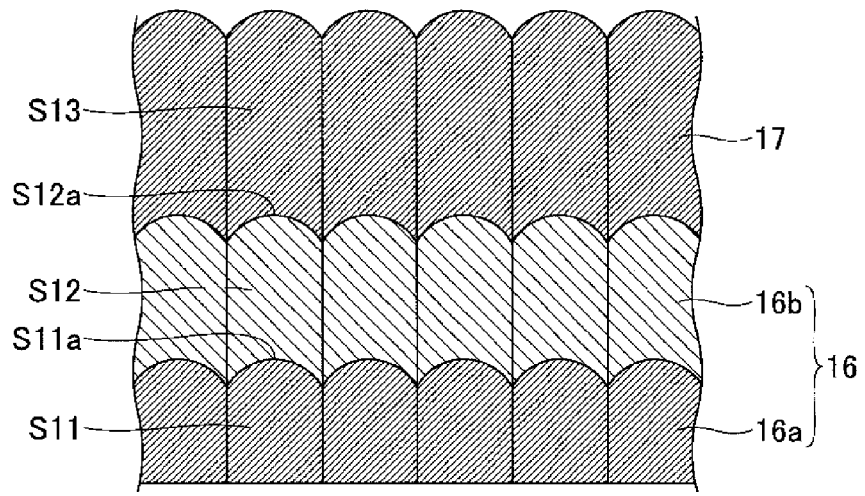
FIG. 7 is a cross sectional view, on an enlarged scale, illustrating a state in which columnar crystals of an intermediate layer and an upper recording layer are grown perpendicularly with respect to the substrate surface.

As illustrated in FIG. 7, the second intermediate layer 16b may include a columnar crystal S12 with a dome-shaped projection formed at a peak part thereof, in continuous with the columnar crystal S11 included in the first intermediate layer 16a and forming the nucleus of the crystal, in the thickness direction. In this embodiment, the second intermediate layer 16b may be grown on the dome-shaped projection of the columnar crystal S11 included in the first intermediate layer 16a and forming the crystal that becomes the nucleus, and include the columnar crystal S12 that is continuous with the crystal particle (or columnar crystal S11) forming the first intermediate layer 16a in the thickness direction.

The second intermediate layer 16b may preferably be formed by a Ru alloy layer that includes a magnetic material and has a saturation magnetization of 50 emu/cc or higher. When the second intermediate layer 16b is formed by a Ru alloy layer that includes a magnetic material but has a saturation magnetization lower than 50 emu/cc, and the first intermediate layer 16a described above is not made of a Ru layer that includes a magnetic material and has a saturation magnetization of 50 emu/cc or higher, a sufficiently high recording characteristic (or OW characteristic) suited for the high-density recording may be difficult to obtain.

Similarly as in the case of the orientation control layer 13, both the first intermediate layer 16a and the second intermediate layer 16b may be formed by a Ru alloy layer including a magnetic material and having a saturation magnetization of 50 emu/cc or higher or, one of the first and second intermediate layers 16a and 16b may be formed by such a Ru alloy layer. In other words, at least one of the first and second intermediate layers 16a and 16b may be formed by the Ru alloy layer including the magnetic material and having the saturation magnetization of 50 emu/cc or higher. Moreover, although the intermediate layer 16 in this embodiment has the two-layer structure formed by the first and second intermediate layers 16a and 16b, the intermediate layer 16 may have a single-layer structure. Furthermore, at least one of the first and second intermediate layers 16a and 16b may be have a multi-layer structure formed by three or more layers.

A third intermediate layer (not illustrated) may preferably be provided between the second soft magnetic layer 15 and the first intermediate layer 16a. When the third intermediate layer is formed by a NiW alloy, for example, crystal particles having a high c-axis orientation may be grown when forming the first intermediate layer 16a having a hcp (hexagonal close-packed) structure on the third intermediate layer, similarly as in the case of the third orientation control layer. When the third intermediate layer is formed by the NiW alloy, a W-content within the NiW alloy, the thickness and the layer structure of the third intermediate layer may be similar to those of the third orientation control layer.

Next, a description will be given of a relationship between the crystal particles forming the intermediate layer 16 and the magnetic particles forming the upper recording layer 17 in the magnetic disk 1, by referring to FIG. 7. FIG. 7 is a cross sectional view, on an enlarged scale, illustrating a state in which columnar crystals of the intermediate layer 16 and the upper recording layer 17 are grown perpendicularly with respect to the substrate surface. In FIG. 7, the illustration of parts of the magnetic disk 1 other than the first and second intermediate layers 16a and 16b forming the intermediate layer 16, and the upper recording layer 17, is omitted.

As illustrated in FIG. 7, a concavo-convex surface S11a may be formed on the first intermediate layer 16a by the dome-shaped projections at the peak parts of the columnar crystals S11 forming the first intermediate layer 16a. The columnar crystals S12 of the crystal particles forming the second intermediate layer 16b may grow on the concavo-convex surface S11a of the first intermediate layer 16a, in the thickness direction. In addition, a concavo-convex surface S12a may be formed on the second intermediate layer 16b by the dome-shaped projections at the peak parts of the columnar crystals S12 forming the second intermediate layer 16b. Columnar crystals S13 of the crystal particles forming the upper recording layer 17 may grow on the columnar crystals S12 forming the second intermediate layer 16b, in the thickness direction. In this embodiment, because the crystal particles of the upper recording layer 17 grow on the dome-shaped projections of the second intermediate layer 16b, the isolation of the crystal particles of the perpendicular magnetic layer that are grown may be promoted, and the isolated crystal particles of the upper recording layer 17 may grow in the form of columnar crystals.

Hence, according to the magnetic disk 1 in this embodiment, the columnar crystals S12 of the second intermediate layer 16b and the columnar crystals S13 of the upper recording layer 17 may grow epitaxially as continuous columnar crystals on the columnar crystals S11 of the first intermediate layer 16a. In this embodiment, the upper recording layer 17 has the multi-layer structure, as illustrated in FIG. 4. The crystal particles forming each of the layers 17a and 17b of the upper recording layer 17 having the multi-layer structure may repeatedly grow epitaxially in the form of continuous columnar crystals, from the intermediate layer 16 up to the second upper recording layer 17b on the upper side of the upper recording layer 17. Hence, in this embodiment, the size of the crystal particles forming the first intermediate layer 16a may be reduced and the density of the columnar crystals S11 may be increased. For this reason, the densities of the columnar crystals S12 of the second intermediate layer 16b that grow from the peak parts of the columnar crystals S11 in the thickness direction, and the columnar crystals S13 of the upper recording layer 17 having the multi-layer structure that grow from the peak parts of the columnar crystals S12 in the thickness direction, may be increased.

(Upper Recording Layer)

The upper recording layer 17 may be formed on the intermediate layer 16. As illustrated in FIG. 4, the upper recording layer 17 in this embodiment may include, from the side of the nonmagnetic substrate 11, the first upper recording layer 17a and the second upper recording layer 17b. The crystal particles forming each of the first and second upper recording layers 17a and 17b may grow epitaxially in the form of columnar crystal in continuous with the columnar crystals of the first and second intermediate layers 16a and 16b of the intermediate layer 16.

Figure 8:
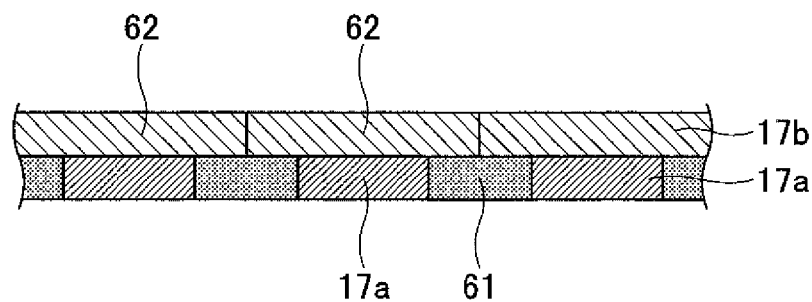
FIG. 8 is a cross sectional view, on an enlarged scale, illustrating a part of a stacked structure of magnetic layers forming the upper recording layer.

FIG. 8 is a cross sectional view, on an enlarged scale, illustrating a part of a stacked structure of the magnetic layers forming the upper recording layer 17. As illustrated in FIG. 8, the first upper recording layer 17a forming the upper recording layer 17 may have a granular structure preferably including magnetic particles (or magnetic crystal particles) 62 including Co, Cr and Pt, and an oxide 61. For example, Cr, Si, Ta, Al, Ti, Mg, Co, and the like may preferably be used for the oxide 61. In addition, $TiO_2$, $Cr_2O_3$, $SiO_2$, and the like may further preferably be used for the oxide 61. Moreover, the first upper recording layer 17a may preferably be formed by a composite oxide in which two or more kinds of oxides are added. The composite oxides may preferably use $Cr_2O_3$—$SiO_2$, $Cr_2O_3$—$TiO_2$, $Cr_2O_3$—$SiO_2$—$TiO_2$, and the like.

The magnetic particles 62 may preferably be dispersed within the first upper recording layer 17a. In addition, the magnetic particles 62 may preferably form a columnar structure that vertically penetrates the first and second upper recording layers 17a and 17b. Satisfactory orientation and crystal properties of the first upper recording layer 17a may be obtained by this columnar structure, and as a result, a SNR suited for the high-density recording may be obtained.

In this embodiment, the alloy composition, structure, deposition method, alloy composition range, and the like of the upper recording layer 17 may basically be the same as those of the lower recording layer 14. However, in the magnetic disk 1 of this embodiment, the lower recording layer 14 has a coercivity higher than that of the upper recording layer 17, that is, the upper recording layer 17 has a coercivity lower than that of the lower recording layer 14, as described above. In addition, the servo information is recorded in the lower recording layer 14 having the higher coercivity, and the data are recorded and reproduced with respect to the upper recording layer 17 having the lower coercivity, as also described above.

(Protection Layer)

The protection layer 18 may be formed on the upper recording layer 17. The protection layer 18 may be provided to prevent corrosion of the upper recording layer 17, and to prevent damage to the medium surface or the magnetic head itself when the magnetic head and the magnetic disk 1 make contact. The protection layer 18 may be made of a known material. For example, the protection layer 18 may be made of a material including $SiO_2$ or $ZrO_2$. From the point of view of realizing a high recording density, the protection layer 18 may preferably have a thickness of 1 nm to 10 nm, for example, in order to reduce the distance between the magnetic head and the magnetic disk 1. For example, the protection layer 18 may be formed by CVD (Chemical Vapor Deposition), PVD (Physical Vapor Deposition), and the like.

(Lubricant Layer)

The lubricant layer 19 may be formed on the protection layer 18. For example, the lubricant layer 19 may preferably be made of a lubricant such as perfluoropolyether, fluorinated alcohol, fluorinated carboxylic acid, and the like. For example, the lubricant layer 19 may be formed by dipping and the like.

(Magnetic Storage Apparatus)

Figure 9:
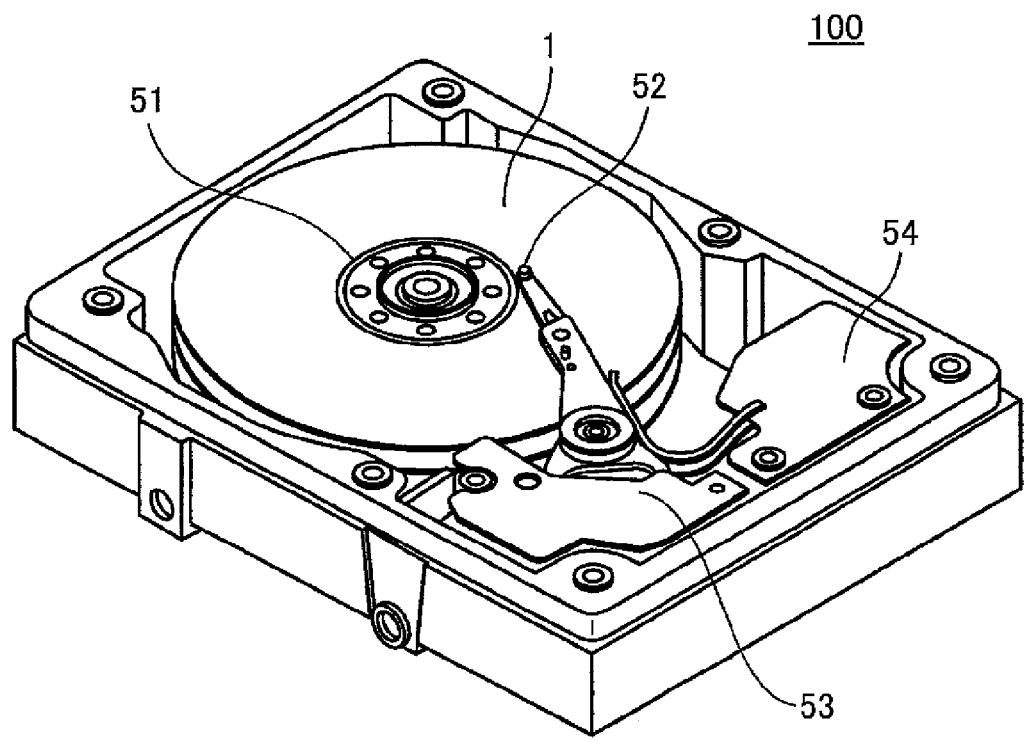
FIG. 9 is a perspective view illustrating an example of a magnetic storage apparatus in one embodiment of the present invention.

FIG. 9 is a perspective view illustrating an example of the magnetic storage apparatus in one embodiment of the present invention. A magnetic disk drive (or HDD) 100 illustrated in FIG. 9 is an example of the magnetic storage apparatus, and is provided with the magnetic disk 1 described above, which is an example of the magnetic recording medium.

The HDD 100 may include the magnetic disk 1 having the structure illustrated in FIG. 1, a medium driving part 51 that rotationally drives the magnetic disk 1, a magnetic head 52 that writes and reads (that is, records and reproduces) information with respect to the magnetic disk 1, a head driving part 53 that moves the magnetic head 52 relative to the magnetic disk 1, and a signal processing part 54. The magnetic head 52 may reproduce the servo information from the magnetic disk 1, and also record and reproduce the data with respect to the magnetic disk 1.

The signal processing part 54 may subject data input from an external host unit (not illustrated) or the like to a known signal processing, in order to supply recording signals suited for the recording on the magnetic disk 1 to the magnetic head 52. For example, a magnetic head suited for the high-density recording and including a reproducing element such as a GMR (Giant Magneto Resistive) element that utilizes the GMR effect, may be used for the magnetic head 52. The signal processing system 43 subjects the signals read from the magnetic disk 1 by the magnetic head 52 to a known signal processing, and outputs reproduced data to the external host unit or the like, and outputs a control signal to the head driving part 53 in order to move the magnetic head 52 to a specified position on the magnetic disk 1, according to the specified position on the magnetic disk 1 and reproduced servo information indicating a present position of the magnetic head 52. The magnetic head 52 that is moved to the specified position on the magnetic disk 1 may read data from the specified position or write data to the specified position.

The medium driving part 51, the magnetic head 52 including a recording element and the reproducing element, the head driving part 53, and the signal processing part 54 may respectively employ known structures, and thus, illustration and detailed description thereof will be omitted.

In the magnetic disk 1, the data region in which the data write and the data read are performed may be provided in the upper recording layer 17 forming the perpendicular magnetic layer, and the servo information region in which the servo information is recorded may be provided in the lower recording layer 14 forming the perpendicular magnetic layer. In other words, the data region and the servo information region may be provided at overlapping regions of the recording surface in the plan view, and are not limited to separate regions of the recording surface in the plan view. Hence, the data region in which the data write and the data read are performed may be extended approximately to the entire recording surface of the magnetic disk 1, and the recording capacity (or in-plane recording density) per unit area of the magnetic disk 1 may be increased.

Because the servo information recorded in the lower recording layer 14 and the data recorded in the upper recording layer 17 may overlap in the recording surface of the magnetic disk 1, the magnetic head 52 may simultaneously read both the servo information and the data. For example, by recording the servo information and the data at different recording frequencies (or write frequencies), the output signal of the magnetic head 52, including the servo information and the data, may be passed through a separating unit (or separating means) that is formed by a filter or amplifiers having different frequency bands, in order to separate the reproduced servo information and the reproduced data. At least a part of the separating unit may be provided within the signal processing part 54.

An example of the separating unit may be formed by a head amplifier for the servo information and a head amplifier for the data, respectively having different frequency bands. In this case, the signals reproduced from the magnetic disk 1 by the magnetic head 52 may be processed in parallel by the head amplifier for the servo information and the head amplifier for the data, in order to output the servo information separated from the reproduced signals from the head amplifier for the servo information, and to output the data separated from the reproduced signals from the head amplifier for the data, utilizing the different frequency bands of the servo information and the data. Another example of the separating unit (or separating means) may include a single head amplifier to which the signals reproduced from the magnetic disk 1 by the magnetic head 52 are input, and a filter that separates the output of the single head amplifier into the servo information and the data, utilizing the different frequency bands of the servo information and the data. In this latter case, the separating unit (or separating means) may further include a first amplifier to amplify the servo information output from the filter, and a second amplifier to amplify the data output from the filter.

The frequency band of the servo information may preferably not overlap the frequency band of the data in a range of 10 MHz to 70 MHz, for example. In addition, the frequency band of the data may preferably not overlap the frequency band of the servo information in a range of 50 MHz to 150

MHz, for example. In this embodiment, the frequency bands of the servo information and the data may refer to the frequency band of the output signal of the magnetic head 52 at the time of the reproduction when the information is read from the magnetic disk 1 within the HDD 100, and the frequency band of the signal at the time of the recording when the data are written on the magnetic disk 1 by the magnetic head 52.

The servo information may preferably have a structure including burst information, address information, and preamble information, similar to the servo information recorded on the known magnetic disk. Hence, the servo information may be reproduced from the magnetic disk 1 by the magnetic head 52 in order to position the magnetic head 52 to a specific position or a specific region on the magnetic disk 1 in a manner similar to that used by the known HDD, and read or write the data from the specified position or specified region on the magnetic disk 1.

Accordingly, the HDD 100 illustrated in FIG. 9 may include the magnetic disk 1 having the SNR, the recording characteristic (or OW characteristic), and the thermal stability, that are suited for the high-density recording.

FIG. 10 is a block diagram illustrating a part of the magnetic storage apparatus. As illustrated in FIG. 10, the HOD 100 may include a magnetic head 82, a head amplifier part 183, a head driving VCM (Voice Coil Motor) 184, the signal processing part 54, and a control circuit 187. The magnetic head 82 may include a reproducing head 82-1 to reproduce the servo information and the data recorded in the magnetic disk 1, and a recording head 82-2 to record the data in the magnetic disk 1. The reproducing head 82-1 is an example of the reproducing element, and the recording head 82-2 is an example of the recording element. The head amplifier part 183 may include a head amplifier 183-1 for servo information, which is an example of a first head amplifier, and a head amplifier 183-2 for data, which is an example of a second head amplifier. The head driving part 53 illustrated in FIG. 9 may include the head driving VCM 184 illustrated in FIG. 10. The signal processing part 54 illustrated in FIG. 9 may include a reproduced signal processing circuit 185 and a recording signal processing circuit 186 illustrated in FIG. 10. The head amplifier part 183, the reproduced signal processing circuit 185, and the control circuit 187 may form an example of a first signal processing system to process the signal output from the reproducing head 82-1 of the magnetic head 82. On the other hand, the recording signal processing circuit 186 may form an example of a second signal processing system to process the signal input to the recording head 82-2 of the magnetic head 82.

In the magnetic disk used in the HDD or the like, the recording of the servo information is performed only once in many cases. This recording is generally performed by the dedicated STW used by the manufacturer of the HDD, and the STW itself is known. In this example, it is assumed for the sake of convenience that such an STW is used to record the servo information in the lower recording layer 15-1 of the magnetic disk 1, having the coercivity higher than that of the upper recording layer 15-2, in the manner described above in conjunction with FIG. 3 so that two mutually adjacent servo tracks partially overlap each other. When the reproducing head 82-1 reproduces the servo information recorded in the servo track, the magnetic head 82 may be moved to a specified position on the magnetic disk 1 where the data recording or reproduction is to be made, according to the position of the reproducing head 82-1 detected from the reproduced servo information by the control circuit 187. The data may be recorded in the upper recording layer 15-2 having the coercivity lower than that of the lower recording layer 15-1 by the recording head 82-2, and the recorded data may be reproduced from the upper recording layer 15-2 by the reproducing head 82-1. The recording of the data to the upper recording layer 15-2 may be performed by the user of the HDD, in addition to the manufacturer of the HDD. The recording head 82-2 that has a relatively low write performance such that the recording head 82-2 is able to record the data only to the upper recording layer 15-2 but not to the lower recording layer 15-1, may be used for the data recording. The recording head 82-2 having such a performance may be similar to the magnetic head provided within the general or existing HDD.

Because the servo information recorded in the lower recording layer 15-1 and the data recorded in the upper recording layer 15-2 overlap in the plan view of the magnetic disk 1, the reproducing head 82-1 may simultaneously reproduce both the servo information and the data. By recording the servo information and the data at mutually different recording frequencies, the separating unit (or separating means) may separate the servo information and the data from the signal that is reproduced from the magnetic disk 1 by the reproducing head 82-1. In the example illustrated in FIG. 10, the head amplifier part 183 may form an example of the separating unit (or separating means). The head amplifier part 183 may include the head amplifier 183-1 for the servo information, and the head amplifier 183-2 for the data, that have mutually different frequency bands in which the signal processing is carried out. Accordingly, by processing the signal reproduced from the magnetic disk 1 by the reproducing head 82-1 in parallel by the head amplifier 183-1 for the servo information and the head amplifier 183-2 for the data, the head amplifier 183-1 for the servo information may output the servo information that is separated from the reproduced signal and the head amplifier 183-2 for the data may output the data separated from the reproduced signal utilizing the mutually different frequency bands of the servo information and the data.

The head amplifier part which forms an example of the separating unit (or separating means) may have a configuration including a single head amplifier to which the signal reproduced from the magnetic disk 1 by the reproducing head 82-1 is input, and a filter that separates an output of this filter into the servo information and the data. In this case, the head amplifier part may have a configuration further including a first amplifier to amplify the servo information output from the filter, and a second amplifier to amplify the data output from the filter.

Returning now to the description of FIG. 10, the servo information output from the head amplifier 183-1 is supplied to the control circuit 187. The control circuit 187 may be formed by a processor, such as a CPU (Central Processing Unit), for example. The control circuit 187 may generate control signals for causing the magnetic head 82 to perform a seek to a target address (that is, specified position) and to perform a tracking, based on an external instruction and the servo information received from the head amplifier 183-1. The control circuit 187 may supply the generated control signals to the head driving VCM 184. The control signals generated by the control circuit 187 may include the control signal, that is generated based on the position of the magnetic head 82 on the magnetic disk 1 detected from the servo information reproduced by the control circuit 187, and controls the head driving VCM 184 to cause the magnetic head 82 to seek to the target address on the magnetic disk 1. The head driving VCM 184 is an example of a head driving part that drives and moves the magnetic head 82 based on the control signal from the control circuit 187, in order to perform a seek operation and a tracking operation. Because the head driving part itself is known, the illustration and description of individual mechanisms and the like that drive the magnetic head 82 in order to perform the seek operation and the tracking operation will be omitted.

The reproduced signal processing circuit 185 may subject the data output from the head amplifier 183-2 to a signal processing before outputting the data. This signal processing in the reproduced signal processing circuit 185 may include a signal processing to convert the data into a reproduced signal having a format that is suited for the signal processing in the external host unit (not illustrated), for example. On the other hand, the recording signal processing circuit 186 may subject an external input signal to be recorded to a signal processing before supplying the external input signal to the recording head 82-2 of the magnetic head 82. This signal processing in the recording signal processing circuit 186 may include a signal processing to convert the external input signal into a recording signal having a format that is suited for the recording to the magnetic disk, for example.

When the signal intensity of the servo information is higher than a reference value, the control circuit 187 may generate a control signal that increases a floating distance (or amount) of the magnetic head 82 from the magnetic disk 1, and this control signal may be supplied to a head floating distance control mechanism in order to record or reproduce the data by the magnetic head 82 with the increased floating distance. Because the servo information is recorded by the STW as described above, the signal intensity of the recorded servo information is stable. For this reason, when the signal intensity of the reproduced servo information is higher than the reference value, it is indicated that the floating distance of the magnetic head 82 from the magnetic disk 1 is lower than the designed value, for example. Hence, in this case, the floating distance of the magnetic head 82 is increased for the data recording or reproduction, so that stable data recording or reproduction may be performed with respect to the upper recording layer 15-2 of the magnetic disk 1.

On the other hand, when the signal intensity of the servo information is lower than the reference value, the control circuit 187 may generate a control signal that reduces the floating distance (or amount) of the magnetic head 82 from the magnetic disk 1, and this control signal may be supplied to the head floating distance control mechanism in order to record or reproduce the data by the magnetic head 82 with the reduced floating distance. When the signal intensity of the reproduced servo information is lower than the reference value, it is indicated that the floating distance of the magnetic head 82 from the magnetic disk 1 is higher than the designed value, for example. Hence, in this case, the floating distance of the magnetic head 82 is reduced for the data recording or reproduction, so that stable data recording or reproduction may be performed with respect to the upper recording layer 15-2 of the magnetic disk 1.

The STW that records the servo information to the lower recording layer 15-1 of the magnetic disk 1 may have a configuration similar to that of the recording system of the HOD 100 illustrated in FIG. 10. However, a recording head of the STW that records the servo information to the lower recording layer 15-01 has a relatively high write performance compared to that of the recording head 82-2 of the HDD 100 that records the data to the upper recording layer 15-2.

Practical Example

Next, a description will be given of practical examples in which the magnetic disk, which is an example of the magnetic recording medium, is fabricated by the following fabrication method and evaluated.

First, a cleaned glass substrate (manufactured by Konica Minolta, Inc. and having an outer diameter of 2.5 inches) is placed within a deposition chamber of a DC magnetron sputtering apparatus (C-3040 manufactured by Canon Anelva Corporation), and the inside of the deposition chamber is evacuated to a vacuum of $1 \times 10^{-5}$ Pa. Thereafter, a bonding layer having a thickness of 10 nm is deposited on the glass substrate by Ar sputtering (sputtering gas pressure of 1 Pa) using a Cr target.

A soft magnetic layer having a thickness of 25 nm is deposited on the bonding layer by Ar sputtering (sputtering gas pressure of 1 Pa) using a 70Co-20Fe-5Zr-5Ta{Fe-content of 20 at %, Zr-content of 5 at %, Ta-content of 5 at %, and the remainder Co} target at a substrate temperature of 100° C. or lower. A Ru layer having a thickness of 0.7 nm is deposited on the soft magnetic layer, and a 70Co-20Fe-5Zr-5Ta soft magnetic layer having a thickness of 25 nm is deposited on the Ru layer, in order to form a first soft magnetic layer.

Next, an orientation control layer having a three-layer structure is formed on the first soft magnetic layer. In other words, Ar sputtering (sputtering gas pressure of 1 Pa) is performed to deposit a 90Ni6W4Co layer (200 emu/cc) having a thickness of 10 nm and a 67Co33Ru layer (87 emu/cc) having a thickness of 10 nm, and the Ar sputtering gas pressure is changed to 10 Pa to deposit a 67Co33Ru layer (87 emu/cc) having a thickness of 10 nm, in order to form the orientation control layer having the three-layer structure.

A magnetic layer having a thickness of 10 nm is deposited on the orientation control layer having the three-layer structure by Ar sputtering (sputtering gas pressure of 2 Pa) using $91(Co_{15}Cr_{16}Pt)-6(SiO_2)-3(TiO_2))$ {91 mol % of an alloy in which Cr-content is 15 at %, Pt-content is 16 at %, the remainder is Co, 6 mol % of an oxide including $SiO_2$, and 3 mol % of an oxide including $TiO_2$}, and a 65Co-18Cr-14Pt-3B layer having a thickness of 6 nm is deposited on this magnetic layer, in order to form a lower recording layer. The coercivity of the lower recording layer is 7000 Oe.

Next, a soft magnetic layer having a thickness of 10 nm is deposited on the lower recording layer by Ar sputtering (sputtering gas pressure of 1 Pa) using a 70Co-20Fe-5Zr-5Ta {Fe-content of 20 at %, Zr-content of 5 at %, Ta-content of 5 at %, and the remainder Co} target at a substrate temperature of 100° C. or lower, in order to form a second soft magnetic layer having an amorphous structure.

Next, an intermediate layer having a three-layer structure is formed on the second soft magnetic layer. In other words, Ar sputtering (sputtering gas pressure of 1 Pa) is performed to deposit a 90Ni6W4Co layer (200 emu/cc) having a thickness of 10 nm and a 67Co33Ru layer (87 emu/cc) having a thickness of 10 nm, and the Ar sputtering gas pressure is changed to 10 Pa to deposit a 67Co33Ru layer (87 emu/cc) having a thickness of 10 nm, in order to form the intermediate layer having the three-layer structure.

A magnetic layer having a thickness of 10 nm is deposited on the intermediate layer having the three-layer structure by Ar sputtering (sputtering gas pressure of 12 Pa) using 60Co-10Cr-20Pt-10SiO$_2$, and a 65Co-18Cr-14Pt-3B layer having a thickness of 6 nm is deposited on this magnetic layer, in order to form an upper recording layer. The coercivity of the upper recording layer is 5000 Oe.

After forming a carbon protection layer having a thickness of 4 nm on the upper recording layer by ion beam deposition, a lubricant layer made of perfluoropolyether is formed on the protection layer by dipping, in order to fabricate the magnetic disk 1 of this embodiment.

(Recording Servo Information)

Next, the STW is used to record the servo information in the fabricated magnetic disk 1. The servo information is recorded using a TMR (Tunnel Magneto Resistive) head having a recording element width of 100 nm, and a recording width to the lower recording layer by this TMR head is 50 nm. When recording the servo information from the outer peripheral side towards the inner peripheral side on concentric servo tracks, an overlap of 25 nm is formed between the servo track that is currently being formed and the servo track formed immediately before, such that the track width in the radial direction is 25 nm. In addition, the recording of the servo information is performed by rotating the magnetic disk 1 at a rotational speed of 7200 rpm, and the recording frequencies have center frequencies of 20 MHz and 40 MHz and a frequency band of ±5 MHz. The servo information has a known structure including the burst information, the address information, and the preamble information. The recording of the servo information is performed simultaneously with respect to the lower recording layer 14 and the upper recording layer 17, and thereafter, an external magnetic field is applied on the upper recording layer 17 in order to erase only the upper recording layer 17.

(Evaluation of Magnetic Recording Medium)

The magnetic disk 1 fabricated in this practical example is evaluated in the following manner. More particularly, the magnetic head 82 not capable of recording to the lower recording layer 14 is used to evaluate the read and write with respect to the upper recording layer 17 of the magnetic disk 1. The evaluation conditions are as follows.

Rotational speed of magnetic disk 1: 7200 rpm

Evaluating head: TMR head with reproducing element and recording element widths of 50 nm Recording frequency: 70 MHz (frequency band of ±5 MHz)

The data recording and reproduction with respect to the upper recording layer 17 of the magnetic disk 1 is performed while positioning the magnetic head 82 based on the servo information recorded in the lower recording layer 14. As a result, compared to a conventional magnetic disk having the same track density as the magnetic disk 1, it was confirmed that a seek velocity increases by 10% on an average, and a recorded amount of the information that is written and read per magnetic disk 1 increases by 20%. It was also confirmed that the SNR is 10.5 dB and the OW characteristic is 42.1 dB, which are both satisfactory. In other words, according to this embodiment, it may be confirmed that the track density in the data region of the magnetic disk 1 may be improved to improve the recording capacity.

According to the embodiment and practical example described above, the recording capacity of the magnetic recording medium and the magnetic storage apparatus may be improved.

Further, the present invention is not limited to these practical examples, but various variations and modifications may be made without departing from the scope of the present invention.

What is claimed is:

1. A servo information recording method comprising:
    continuously recording, by a magnetic head, servo information in a radial direction of a magnetic disk on a plurality of concentric tracks or on a single spiral track of a first recording layer that forms a magnetic layer of the magnetic disk together with a second recording layer to which data are recorded and from which data are reproduced, wherein the first recording layer has a coercivity higher than that of the second recording layer; and
    partially overlapping two mutually adjacent tracks when continuously recording the servo information on an entire surface of the first recording layer in the radial direction from an inner peripheral side towards an outer peripheral side of the magnetic disk, or from the outer peripheral side towards the inner peripheral side of the magnetic disk,
    wherein a distance between the magnetic head and the first recording layer is longer than a distance between the magnetic head and the second recording layer during the continuously recording.

2. The servo information recording method as claimed in claim 1, wherein the continuously recording simultaneously records the servo information with respect to the first recording layer and the second recording layer, and thereafter applies an external magnetic field to the first recording layer in order to erase only the first recording layer.

3. The servo information recording method as claimed in claim 1, wherein the magnetic disk includes
    a first soft magnetic layer;
    an orientation control layer made of an Ru alloy and provided on the first soft magnetic layer;
    the first recording layer provided on the orientation control layer; and
    an intermediate layer made of an Ru alloy and provided between the first recording layer and the second recording layer.

4. The servo information recording method as claimed in claim 3, wherein the magnetic disk further includes
    a second soft magnetic layer provided on the first recording layer,
    wherein the intermediate layer is provided on the second soft magnetic layer, and the second recording layer is provided on the intermediate layer.

5. A magnetic storage apparatus comprising:
    the magnetic disk recorded with the servo information by the servo information recording method as claimed in claim 1;
    the magnetic head configured to reproduce the servo information from the first recording layer of the magnetic disk, and to record data to or reproduce data from the second recording layer of the magnetic disk; and
    a signal processing part configured to perform a signal processing on input data to supply a recording signal to the magnetic head, and to perform a signal processing on a signal reproduced from the magnetic disk by the magnetic head to supply reproduced data to an outside of the magnetic storage apparatus.

6. The magnetic storage apparatus as claimed in claim 5, further comprising:
    a head driving part configured to move the magnetic head relative to the magnetic disk; and
    a control circuit,
    wherein the signal processing part separates reproduced servo information from the signal reproduced from the magnetic disk by the magnetic head, and supplies the reproduced servo information to the control circuit,
    wherein the control circuit supplies to the head driving part a control signal that causes head driving part to move the magnetic head to a specified position on the magnetic disk, based on the specified position and the reproduced servo information indicating a current position of the magnetic head, and
    wherein the magnetic head performs data reproduction or data recording with respect to the second recording layer of the magnetic disk from the specified position.

7. The magnetic storage apparatus as claimed in claim 5, wherein a recording frequency of the data recorded to the second recording layer of the magnetic disk is different from a recording frequency of the servo information recorded in the first recording layer.

8. A magnetic storage apparatus comprising:
- a magnetic disk continuously recorded with servo information in a radial direction thereof on a plurality of concentric tracks or on a single spiral track of a first recording layer that forms a magnetic layer together with a second recording layer to which data are recorded and from which data are reproduced, wherein the first recording layer has a coercivity higher than that of the second recording layer, and two mutually adjacent tracks of the continuously recorded servo information on an entire surface of the first recording layer partially overlap each other;
- a magnetic head configured to reproduce the servo information from the first recording layer of the magnetic disk, and to record data to or reproduce data from the second recording layer of the magnetic disk; and
- a signal processing part configured to perform a signal processing on input data to supply a recording signal to the magnetic head, and to perform a signal processing on a signal reproduced from the magnetic disk by the magnetic head to supply reproduced data to an outside of the magnetic storage apparatus,
- wherein a distance between the magnetic head and the first recording layer is longer than a distance between the magnetic head and the second recording layer.

9. The magnetic storage apparatus as claimed in claim 8, further comprising:
- a head driving part configured to move the magnetic head relative to the magnetic disk; and
- a control circuit,
- wherein the signal processing part separates reproduced servo information from the signal reproduced from the magnetic disk by the magnetic head, and supplies the reproduced servo information to the control circuit,
- wherein the control circuit supplies to the head driving part a control signal that causes head driving part to move the magnetic head to a specified position on the magnetic disk, based on the specified position and the reproduced servo information indicating a current position of the magnetic head, and
- wherein the magnetic head performs data reproduction or data recording with respect to the second recording layer of the magnetic disk from the specified position.

10. The magnetic storage apparatus as claimed in claim 8, wherein a recording frequency of the data recorded to the second recording layer of the magnetic disk is different from a recording frequency of the servo information recorded in the first recording layer.

11. The magnetic storage apparatus as claimed in claim 8, wherein the magnetic head simultaneously reproduces the servo information from the first recording layer and the data from the second recording layer of the magnetic disk.

* * * * *